United States Patent Office 3,361,833
Patented Jan. 2, 1968

3,361,833
STABILIZED CHLOROFLUOROCARBON COMPOSITIONS
Francis W. Blodgett, Oakland, Calif., assignor to Kaiser Aluminum & Chemical Corporation, Oakland, Calif., a corporation of Delaware
No Drawing. Filed July 27, 1964, Ser. No. 385,471
3 Claims. (Cl. 260—652.5)

This invention relates to stabilized chlorofluorocarbon compositions, and especially to chlorofluorocarbon compositions that do not decompose in the presence of compounds containing primary hydroxyl groups.

Chlorofluorocarbons are frequently employed in conjunction with materials containing hydroxyl groups. For example, chlorofluorocarbons are used as propellants to spray alcohol-containing compositions from self-pressurized or aerosol containers, and as foaming agents for plastics intermediates that include alcohols or polyhydroxy materials. One particularly useful composition of this invention is stabilized trichlorofluoromethane for use as the foaming ingredient in compositions containing polyols such as hydroxy-terminated polyesters or polyethers, glycols, etc., which react with polyisocyanates in the presence of trichlorofluoromethane to produce polyurethane foam.

In the presence of compounds containing primary hydroxyl groups, chlorofluorocarbons react to produce hydrogen chloride and other compounds that may be undesirable in the environment in which they are used.

These decomposition products of chlorofluorocarbons cause discoloration and gradual deterioration of the foaming properties of reactive compositions and of the properties of the foamed plastic bodies made from them. The presence of hydrogen chloride and other decomposition products in aerosol cans corrodes the containers and contaminates the material to be dispensed.

This invention deals with chlorofluorocarbon compositions that are stabilized against decomposition in the presence of compounds containing primary hydroxyl groups. The compositions of this invention comprise chlorofluorocarbons and a mixture of secondary and tertiary terpene alcohols together with such other terpene compounds as occur in pine oil in minor amounts. When such inhibitors are present in effective amounts, which have been found to be as little as 0.1% by weight, the decomposition reactions which form hydrogen chloride and other undesirable material are prevented entirely over short periods of time, and are diminished substantially even when the compositions remain standing for a long period of time.

Generally, the higher the chlorine content of the chlorofluorocarbon molecule, the more susceptible that molecule is to attack. Accordingly, compounds such as trichlorofluoromethane are particularly vulnerable to reaction with compounds containing primary hydroxyl groups and this invention is therefore particularly useful in stabilizing chlorofluorocarbons having high chlorine content, especially trichlorofluoromethane.

In one embodiment this invention includes compositions of chlorofluorocarbons and mixtures of secondary and tertiary terpene alcohols, and in another embodiment the invention includes compositions of chlorofluorocarbons, mixtures of secondary and tertiary terpene alcohols, and reactive compounds containing primary hydroxyl groups.

The stability of the compositions of the present invention in the presence of primary hydroxyl groups is surprising in view of the fact that the inhibitors or stabilizing compounds are in large part themselves alcohols. However, the stabilizing compositions are selected alcohols in that they must be secondary and tertiary terpene alcohols. Although it is known that secondary and tertiary alcohols do not cause decomposition of chlorofluorocarbons, it is unexpected that these compositions will actually provide an inhibiting effect upon the undesirable decomposition reactions.

As stated above, as little as 0.1% by weight of the terpene alcohol inhibiting mixture based on the chlorofluorocarbon produces the inhibiting effect in chlorofluorocarbons to a significant degree. However, up to 1% or more of the inhibiting terpene alcohol mixture may be employed, the amount to be used depending upon the particular chlorofluorocarbon, the concentration of hydroxyl compounds present, and the length of time that the composition is to be stored. Also to be considered are the storage conditions, whether hot or cold, whether in metal or glass containers, and whether the chlorofluorocarbons are pure or contaminated.

Following are several examples which illustrate selected embodiments of this invention and which are presented as being illustrative rather than limiting on its scope. In the examples reported below a system was selected that has been found to be an extremely difficult system to stabilize. The object of selecting such a difficult system is to demonstrate the effectiveness of the stabilizer on an accelerated or aggravated basis, so that any inhibiting effect that is demonstrated is meaningful. Thus, in selecting a reactive system to stabilize and in providing a long time period for detrimental reactions to occur, even small improvements in stabilizing the systems are significant.

In the results reported below, a system was used which included trichlorofluoromethane as the chlorofluorocarbon, and a hydroxy-terminated polyether polyol having a hydroxyl number of 560. The system also included a flame-retardant polyol based on an organic phosphate, a polyol based on ethylene diamine, trimethylpiperazine as a tertiary amine typical of those used to catalyze polyurethane-forming reactions, and a silicone fluid surfactant, as shown in Table I.

TABLE I.—TEST SYSTEM

| | Parts |
|---|---|
| Sorbitol/propylene oxide polyether polyol, hydroxyl number 560 [a] | 100 |
| Phosphate-based polyol [b] | 15 |
| N,N,N',N'-tetrakis-(2-hydroxypropyl) ethylene-diamine [c] | 15 |
| 1,2,4-trimethylpiperazine | 1.4 |
| Silicone fluid [d] | 1.4 |
| Trichlorofluoromethane plus inhibitor | 36 |
| Polymethylene polyphenylisocyanate [e] | 135 |

[a] Atlas Chemical Industries, Inc., G-2508.
[b] Virginia-Carolina Chemical Corp., Vircol VC-82.
[c] Wyandotte Chemicals Corp., Quadrol.
[d] Dow-Corning Corp., DC-113.
[e] Carwin Co., division of the Upjohn Co., "PAPI."

Each test was effected by preparing a mixture of the polyol-catalyst-surfactant system and trichlorofluoromethane containing the stabilizer, and storing the resultant mixture for three weeks, after which it was subjected to visual examination and reactivity testing. The reactivity was tested by blending 25 grams of the three-week-old mixture with 20 grams of polymethylene polyphenylisocyanate and measuring the time until various identifiable points in the reaction occurred. The significant points that were observed were the *rise time* which is the period from first blending the ingredients until the foam rise is completed, and the *tack-free time* which is the time until the foamed reaction product is no longer tacky to the touch. Undesirable degradation of this mixture was indicated by:

(1) Change in color, that is a darkening of the original clear and slightly yellow mixture, which change in color is carried through to the foamed product;
(2) Increase in the rise time;
(3) Increase in the tack-free time.

The sources of inhibitor in all cases were pine oils which contained at least 75% secondary and tertiary terpene alcohols. In all cases the concentration of inhibitor was calculated as a percentage of the chlorofluorocarbon. The concentration of various terpene alcohols and related compounds varies from one pine oil to another depending on the degree of refining and the physical properties. The best results were obtained by using a partially-refined straight-run pine oil. The results obtained in a group of tests conducted as set forth above on mixtures that were aged 21 days are shown in Table II.

The color ratings are on a scale of 0 to 10 with 10 representing the most discoloration and 0 representing no discoloration at all. The color rating is approximately linear and relatively subjective; it is not intended to represent accurately the degree of decomposition. However, it does represent accurately the degree of suitability of the mixture for preparing polyurethane foams which are not discolored.

TABLE II.—TEST RESULTS ON SYSTEM SHOWN IN TABLE I AFTER AGING FOR 21 DAYS

| Inhibitor | Percent | Color Scale | Time (seconds) | |
|---|---|---|---|---|
| | | | Rise | Tack-Free |
| None (original) | | 1 | 280 | 480 |
| Pine Oil A | 0.2 | 2 | 270 | 480 |
| Do | 0.5 | 2 | 280 | 480 |
| Pine Oil B | 0.2 | 1 | 405 | 513 |
| Do | 0.5 | 1 | 405 | 520 |
| Alpha-terpineol | 0.5 | 7 | 405 | 520 |
| None (after aging) | | 10 | 420 | 555 |

| Pine oil | Distillation Range, °C. | Sp.Gr. | Approximate Composition | | |
|---|---|---|---|---|---|
| | | | Total Terpene Alcohols, Percent | Secondary Alcohols, Percent | Tertiary Alcohols, Percent |
| A | 205–220 | .934 | 85 | 15–20 | 65–70 |
| B | 212–220 | .941 | 91 | 10–15 | 75–80 |

As shown in Table II, Pine Oil A inhibited any decrease in reactivity over the period of 21 days. Pine Oil B, a narrower distillation cut, was superior in maintaining the original light color, but not the original high reactivity. Alpha-terpineol, the major constituent of pine oil, is almost ineffective by itself, as shown by a comparison with an aged system to which no inhibitor had been added. Similarly, various terpene hydrocarbons were found to be essentially ineffective.

It should be noted that both types of pine oil, i.e., Pine Oil A and Pine Oil B, in the table above, each contain several percent of other materials naturally occurring with the secondary and tertiary terpene alcohols. These include, for example, estragole, fenchone and related terpene aldehydes, ketones and the like. The precise function, if any, of these compounds as solvents or mutual synergists, is not understood at this time.

What is claimed is:

1. A stabilized trichlorofluoromethane composition stabilized against reaction with polyols containing a primary hydroxyl group and which react with polyisocyanates in the presence of trichloromonofluoromethane to produce polyurethane foam, said composition comprising trichlorofluoromethane and a stabilizing amount of a mixture of secondary and tertiary terpene alcohols obtained from the 205–220° C. distillation fraction of pine oil.

2. A stabilized trichlorofluoromethane composition comprising trichlorofluoromethane and from about 0.1 to about 1% by weight of a mixture of secondary and tertiary terpene alcohols obtained from the 205–220° C. distillation fraction of pine oil.

3. A stabilized trichlorofluoromethane composition comprising trichlorofluoromethane and from about 0.15 to about 0.75% by weight of a mixture of secondary and tertiary terpene alcohols obtained from the 205–220° C. distillation fraction of pine oil.

References Cited

UNITED STATES PATENTS

| 2,310,971 | 2/1943 | Lincoln et al. | 260—652.5 |
| 3,090,818 | 5/1963 | Long | 260—652.5 |

FOREIGN PATENTS

| 353,858 | 5/1905 | France. |

LEON ZITVER, *Primary Examiner.*

M. JACOB, *Assistant Examiner.*